US006849569B2

(12) United States Patent
Moren

(10) Patent No.: US 6,849,569 B2
(45) Date of Patent: Feb. 1, 2005

(54) INITIATOR SYSTEMS COMPRISING β-KETONE COMPOUNDS

(75) Inventor: Dean M. Moren, North Saint Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 200 days.

(21) Appl. No.: 10/037,074

(22) Filed: Dec. 31, 2001

(65) Prior Publication Data

US 2003/0228973 A1 Dec. 11, 2003

(51) Int. Cl.[7] ................................................ B01J 31/00
(52) U.S. Cl. .......................... 502/172; 502/103; 556/11
(58) Field of Search ................................ 502/172, 103; 556/11

(56) References Cited

U.S. PATENT DOCUMENTS

| | | | | |
|---|---|---|---|---|
| 4,538,920 A | | 9/1985 | Drake | |
| 5,082,147 A | | 1/1992 | Jacobs | |
| 5,106,928 A | | 4/1992 | Skoultchi et al. | |
| 5,286,821 A | | 2/1994 | Skoultchi | |
| 5,310,835 A | | 5/1994 | Skoultchi et al. | |
| 5,616,796 A | | 4/1997 | Pocius et al. | |
| 6,242,513 B1 | * | 6/2001 | Zhou et al. | 523/427 |
| 6,252,023 B1 | * | 6/2001 | Moren | 526/196 |
| 6,291,593 B1 | | 9/2001 | Cheng | |
| 6,384,165 B1 | * | 5/2002 | Moren | 526/196 |
| 6,410,667 B1 | * | 6/2002 | Moren | 526/217 |
| 6,479,602 B1 | * | 11/2002 | Moren | 526/196 |
| 6,486,090 B1 | * | 11/2002 | Moren | 502/171 |

FOREIGN PATENT DOCUMENTS

| | | |
|---|---|---|
| EP | 0 561 352 A1 | 9/1993 |
| WO | WO 97/07171 A1 | 2/1997 |
| WO | WO 97/17383 A1 | 5/1997 |
| WO | WO 98/17694 A1 | 4/1998 |
| WO | WO 99/64475 A1 | 12/1999 |
| WO | WO 01/32716 A1 | 5/2001 |
| WO | WO 01/32717 A2 | 5/2001 |
| WO | WO 01/68783 A2 | 9/2001 |

OTHER PUBLICATIONS

ASTM D4339–95, "Standard Test Method for Determination of the Odor of Adhesives".

*Reports of the Institute for Medical and Dental Engineering*, Fujisawa, Imai, and Mashuhara, vol. 3, p. 64, 1969.

Edelman, Peter G., Mathisen, Richard J., and Huang, Samuel J., "Poly(amide–enamines)/Teaches the Condensation Reaction of 1,3–diketones with Amines", *Polym. Sci. Technol.* 31 (Adv, Polym. Synth.), 1985, pp. 275–290.

U.S. Ser. No. 10/037,058, filed on Dec. 31, 2001, "Metal Salt Modifiers For Bonding Compositions", pp. 1–54.

* cited by examiner

*Primary Examiner*—Mark L. Bell
*Assistant Examiner*—Jennine Brown

(57) ABSTRACT

The invention provides initiator systems capable of initiating polymerization. More specifically, the invention relates to initiator systems comprising a complexed initiator and a β-ketone compound decomplexer. The invention further relates to the use of these initiator systems for initiating polymerization, as well as kits, bonding compositions, and polymerized compositions made therewith, and coated substrates and bonded articles prepared therefrom.

14 Claims, No Drawings

INITIATOR SYSTEMS COMPRISING β-KETONE COMPOUNDS

FIELD

This invention relates generally to systems capable of initiating polymerization. More specifically, the invention relates to initiator systems comprising a complexed initiator and a decomplexer. The invention further relates to the use of these initiator systems for initiating polymerization, as well as kits, bonding compositions, and polymerized compositions made therewith, and coated substrates and bonded articles prepared therefrom.

BACKGROUND

Systems for initiating the polymerization of monomers to make adhesive compositions are known in the art. U.S. Pat. Nos. 5,106,928, 5,286,821, and 5,310,835 to Skoultchi et al., for example, describe two-part initiator systems for initiating the polymerization of acrylic monomers. The first part of these two-part systems includes a stable organoborane amine complex and the second part includes an activator. The activator liberates the organoborane compound by removing the amine group, thereby allowing the organoborane compound to initiate the polymerization process. Activators are also sometimes referred to as liberators or decomplexers.

U.S. Pat. No. 5,286,821 to Skoultchi describes that suitable activators for liberating the organoborane compound include aldehydes having the general structure:

$$R—(CHO)_x$$

wherein R is an alkyl group having 1 to 10 carbon atoms or an aryl group having 6 to 10 carbon atoms and x is 1 to 2. Examples include benzaldehyde; o-, m-, p-nitrobenzaldehyde; 2,4-dichlorobenzaldehyde; p-tolylaldehyde; and 3-methoxy-4 hydroxybenzaldehyde.

U.S. Pat. Nos. 5,310,835 and 5,106,928 describes that suitable activators for liberating the organoborane compound also include organic acids having the structure:

$$R—COOH$$

wherein R is H, an alkyl group, or an alkenyl group having 1 to 8 carbon atoms. Examples include acrylic acid, methacrylic acid, benzoic acid, and p-methoxybenzoic acid.

Fujisawa, Imai, and Mashuhara also describe a system for initiating the polymerization of methyl methacrylate (See, *Reports of the Institute for Medical and Dental Engineering*, vol. 3, page 64 (1969)). The system comprises a trialkylborane amine complex and an activator such as the chloride of methacrylic or n-butane sulfonic acid, terephthalic acid chloride, benzoyl chloride, p-toluene sulfonic acid chloride, benzene sulfonic acid chloride, methane sulfonic acid chloride, toluene diisocyanate, adipic acid chloride, o-tolyl isocyanate, acetyl chloride, and acetic acid anhydride. The initiator system is reportedly useful in providing fast curing resins for dental applications.

One disadvantage of some of the aforementioned activators, however, is the relatively high odor of the activators and the composition in which they are used. Furthermore, another disadvantage of some of these activators is the relatively high level of mobile activator-amine reaction products (i.e., activator-amine constituents) in resulting adhesives. Typically, activators liberate the organoborane compound by bonding (either covalently or ionically) to the amine to form an activator-amine constituent. Most activator-amine constituents remain in the adhesive composition as mobile constituents that are not incorporated into the polymerized adhesive per se. In general, mobile constituents in adhesive compositions may cause performance problems when, for example, they migrate to the surface of the adhesive thereby disrupting the bond interface. Mobile constituents are also susceptible to attack by solvents, thereby making the adhesive composition less suitable for applications where exposure to solvents is unavoidable.

Recently, it has been disclosed that certain activators are useful for reducing the level of mobile constituents in adhesive compositions polymerized therewith. For example, PCT Publication No. WO 97/07171 discloses bireactive decomplexers preferably comprising at least one free-radically polymerizable group and at least one amine-reactive group, preferably an isocyanate group, in the same molecule. The bireactive decomplexers are capable of forming a covalent bond with both acrylic monomers and the amine portion of the organoborane amine complex. Accordingly, the decomplexer is capable of covalently bonding to the liberated amine in the system and also reacting into the adhesive per se.

PCT Publication No. WO 97/17383 discloses decomplexers comprising at least one anhydride group. Preferred anhydrides have one of the following structures:

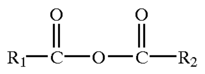 or 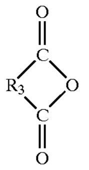

wherein $R_1$ and $R_2$ may independently be an aliphatic group; a cycloaliphatic group; or an aromatic group. $R_3$ is a divalent organic radical that completes a cyclic structure with the anhydride group. It is further preferred that the decomplexer comprises at least one free radically polymerizable group that is capable of forming a covalent bond with an acrylic monomer, such that the decomplexer-amine reaction product is capable of forming covalent bonds with acrylic monomer (s) and can be incorporated into the polymerized adhesive per se.

PCT Publication No. WO 99/64475 reports that suitable activators for liberating the organoborane compound also include carboxylic acids having the structure represented below:

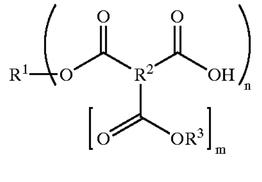 or 

wherein:

$R^1$ is selected from the group consisting of hydrogen, a monovalent organic group, and a multivalent organic group;

$R^2$ is a multivalent organic group;

$R^3$ is selected from the group consisting of hydrogen and a monovalent organic group;

R is a monovalent organic group comprising an alkyl group having at least nine carbon atoms, preferably at least 15 carbon atoms;

m is an integer of 0–2; and n is an integer greater than or equal to one.

The previously reported decomplexing agents including, for example, carboxylic acids, carboxylic acid chlorides, carboxylic acid anhydrides, aldehydes, isocyanates, and sulfonyl chlorides can be corrosive, irritating or hydrolytically unstable materials. In addition, these previously disclosed decomplexing agents generally react quickly with organoborane-amine complexes, thereby quickly freeing the organoborane for initiation of free radical polymerization. Rapid initiation of free radical polymerization may lead to an undesirably short worklife of the bonding composition. In view of the foregoing, what is needed is a substantially non-corrosive, non-irritating, storage stable decomplexing agent which preferably reacts slowly with an organoborane-amine complex, slowly freeing organoborane for initiation of free radical polymerization, and thus providing longer bonding composition worklife.

SUMMARY

Initiator systems of the present invention comprise both a complexed initiator (e.g., an organoborane amine complex) and a β-ketone compound decomplexer. Initiator systems of the present invention are particularly suitable for preparing bonding compositions having a long worklife.

In one embodiment, the present invention provides an initiator system comprising:

a complexed initiator; and a β-ketone compound decomplexer having a structure represented by formula (1) or formula (2):

(1)

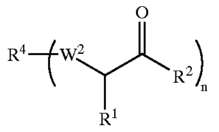

or (2)

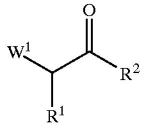

wherein for formula (1):

$R^1$ is hydrogen or an organic group;

$R^2$ is an organic group;

$W^2$ is an electron withdrawing group selected from the group consisting of $—O_2C—$, —(CO)—, —HN(CO)—, and $—NR^3(CO)—$; where $R^3$ is an organic group;

$R^4$ is an organic group having valence n; and n is an integer greater than zero;

and wherein for formula (2):

$R^1$ is hydrogen or an organic group;

$R^2$ is an organic group; and $W^1$ is an electron withdrawing group selected from the group consisting of NC— and $H_2N(CO)—$.

In another embodiment, the β-ketone compound decomplexers may be described as acetoacetates or acetoacetamides. Acetoacetate decomplexers have the formula:

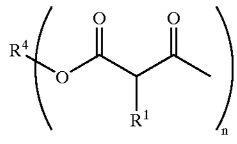

and acetoacetamides decomplexers have the formulas:

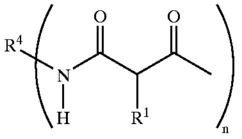

and

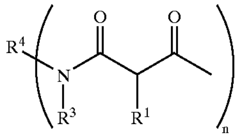

where the various substituents are as described above.

Representative examples of β-ketone compound decomplexers include methyl acetoacetate, ethyl acetoacetate, t-butyl acetoacetate, 2-methacryloyloxyethyl acetoacetate, diethylene glycol bis(acetoacetate), polycaprolactone tris(acetoacetate), polypropylene glycol bis(acetoacetate), poly(styrene-co-allyl acetoacetate), N,N-dimethylacetoacetamide, N-methylacetoacetarnide, acetoacetanilide, ethylene bis(acetoacetamide), polypropylene glycol bis(acetoacetamide), acetoacetamide, and acetoacetonitrile.

In another embodiment, the initiator system further comprises a second decomplexer. The second decomplexer may be, for example, another β-ketone compound decomplexer, or it may be, for example, an anhydride decomplexer. Preferred anhydride decomplexers are methacrylic anhydride, succinic anhydride, maleic ahhydride, glutaric anhydride, itaconic anhydride, and hexahydrophthalic anhydride.

In another embodiment, the present invention provides a bonding composition comprising:

(1) a polymerizable composition comprising:
   at least one polymerizable monomer, and
   a β-ketone compound decomplexer having a structure represented by formula (1) or formula (2) (as set forth above); and (2) a complexed initiator (preferably a complexed organoborane initiator).

The bonding composition may optionally include a metal salt modifier. Representative examples of metal salts include copper (II) bromide, copper (II) chloride, copper (II) 2-ethylhexanoate, iron (III) bromide, vanadium (III) bromide, chromium (III) bromide, ruthenium (III) bromide, copper (II) tetrafluoroborate, copper (II) trifluoromethanesulfonate, copper (II) naphthenate, copper (I) bromide, iron (II) bromide, manganese (II) bromide, cobalt (II) bromide, nickel (II) bromide, antimony (III) bromide, and palladium (II) bromide.

The β-ketone compound decomplexers are useful in kits that comprise a polymerizable composition (which includes the decomplexer and at least one polymerizable monomer) and an initiator component (which includes the complexed initiator and an optional diluent) for polymerizing the polymerizable composition. Such kits are useful for bonding low surface energy substrates. For ease of application, the kits can further comprise a multi-part dispenser. Once the parts of the kit are mixed together, bonding compositions are obtained. The bonding compositions can be at least partially coated onto a substrate, preferably a low surface energy substrate. Once polymerized, a polymerized composition is obtained. The polymerized composition can be used to adhere a first and second substrate together in a bonded article.

As used herein the terms "monovalent organic group" and "multivalent organic group" mean an organic moiety wherein the available valencies are on carbon atoms. Monovalent organic groups have one available valency. Accordingly, multivalent organic groups have more than one available valency.

As used herein the term "organic groups" can be aliphatic groups or cyclic groups. In the context of the present invention, the term "aliphatic group" means a saturated or unsaturated, linear or branched, hydrocarbon group. This term is used to encompass alkylene, alkenylene, alkynylene, alkyl, alkenyl, and alkynyl groups, for example. The term "alkyl group" means a monovalent, saturated, linear or branched, hydrocarbon group (e.g., a methyl, ethyl, isopropyl, t-butyl, heptyl, dodecyl, octadecyl, amyl, or 2-ethylhexyl group, and the like). The term "alkylene" means a multivalent, saturated, linear or branched hydrocarbon group. The term "alkenyl group" means a monovalent, unsaturated, linear or branched, hydrocarbon group with one or more carbon-carbon double bonds (e.g., a vinyl group). The term "alkenylene" means a multivalent, unsaturated, linear or branched, hydrocarbon group with one or more carbon-carbon double bonds. The term "alkynyl group" means a monovalent, unsaturated, linear or branched, hydrocarbon group with one or more carbon-carbon triple bonds. The term "alkynylene" means a multivalent, linear or branched, hydrocarbon group with one or more carbon-carbon triple bonds.

The term "cyclic group" means a closed ring hydrocarbon group that is classified as an alicyclic group, aromatic group, or heterocyclic group. The term "alicyclic group" means a cyclic hydrocarbon group having properties resembling those of aliphatic groups. The term "aromatic group" or "aryl group" means a mononuclear aromatic hydrocarbon group or polynuclear aromatic hydrocarbon group.

Organic groups or organic linking groups, as used herein, can include heteroatoms (e.g., O, N, or S atoms), such as in the case of heterocyclic groups, as well as functional groups (e.g., carbonyl groups).

DETAILED DESCRIPTION

This invention provides initiator systems capable of initiating polymerization. More specifically, the invention provides "initiator systems" comprising (1) a complexed initiator (e.g., an organoborane amine complex) and (2) a β-ketone compound decomplexer. By utilizing β-ketone functional groups on the decomplexers, as compared to previously reported decomplexers, the decomplexers of the present invention typically react more slowly with a complexed initiator thereby providing longer bonding composition worklife.

In one aspect of the invention, the initiator system is part of a multi-part kit. Such kits comprise at least a first part (i.e., a polymerizable composition) and a second part (i.e., an initiator component) for initiating polymerization of the polymerizable composition. Most preferably, for ease of use, the kits comprise only two parts. The two parts of the kit may be readily combined in a convenient, commercially useful, whole number mix ratio of 1:10 or less, more preferably 1:4, 1:3, 1:2 or 1:1, such that they can be easily used with multi-part dispensers. Such dispensers are shown in U.S. Pat. Nos. 4,538,920 and 5,082,147 and are available from ConProTec, Inc. (Salem, N.H.) under the trade designation, MIXPAC. The parts of the kit can be readily mixed to form bonding compositions, which readily polymerize to polymers, for example, adhesives.

The "polymerizable composition" typically comprises at least one β-ketone compound decomplexer and at least one polymerizable monomer. Optionally, another type of decomplexer, for example, carboxylic acids, carboxylic acid chlorides, carboxylic acid anhydrides, aldehydes, isocyanates, and sulfonyl chlorides may also be included in the polymerizable composition. Most preferably, the decomplexer is a relatively low odor decomplexer.

"Low odor decomplexers" are those that have less odor than methyl methacrylate. Odor can be quantitatively measured using known methods, such as, for example, ASTM D4339-95, "Standard Test Method for Determination of the Odor of Adhesives."

The "initiator component" typically comprises at least one complexed initiator (e.g., organoborane amine complex) and an optional diluent. When mixed with the polymerizable composition, the decomplexer in the polymerizable composition liberates the initiator (e.g., organoborane) from the complexer (e.g., amine), enabling polymerization of the monomer to be initiated.

"Bonding compositions" are those compositions resulting from mixing of the polymerizable composition and the initiator component. The bonding compositions are useful for bonding a wide variety of substrates, including polymers, wood, ceramics, concrete, and metals. The bonding compositions are especially useful for bonding low-surface energy substrates.

"Low surface energy substrates" are those that have a surface energy of less than 45 $mJ/m^2$, more typically less than 40 $mJ/m^2$ or less than 35 $mJ/m^2$. Included among such materials are polytetrafluoroethylene, polyethylene, and polypropylene. Other polymers of somewhat higher surface energy that may be usefully bonded with the compositions of the invention include polycarbonate and polymethylmethacrylate. However, the invention is not so limited; the compositions may be used to bond any thermoplastic, as well as wood, ceramics, concrete, primed metals, and the like.

"Polymerized compositions" (also referred to as polymers) are those bonding compositions where substantially all of the monomers in the polymerizable composition are polymerized except for a typically unpolymerized amount as recognizable to one of ordinary skill in the art. Polymerized compositions according to the invention may be used in a wide variety of ways, including as adhesives, bonding materials, sealants, coatings, and injection molding resins. They may also be used as matrix resins in conjunction with glass, carbon, and metal fiber mats, such as those used in resin transfer molding operations. They may further be used as encapsulants and potting compounds, such as in the manufacture of electrical components, printed circuit boards, and the like.

Decomplexer

The term "decomplexer" means a compound capable of liberating the initiator (e.g., organoborane) from its complexer (e.g., amine), thereby enabling initiation of the polymerization process. Decomplexers are also sometimes referred to as "activators" or "liberators." As used herein, each of these terms has the same meaning.

In the present invention, the decomplexer has a β-ketone group that is capable of forming a covalent bond with the amine portion of the organoborane amine complex to liberate the organoborane compound. Hereinafter, such decomplexers will be referred to as β-ketone compound decomplexers. Examples of such β-ketone compound decomplexers include molecules comprising a single β-ketone group (see, formula 2) and molecules comprising two or more β-ketone groups (see, formula 1). β-ketone compound decomplexers useful in the present invention may be represented by formula (1) or formula (2):

(1)

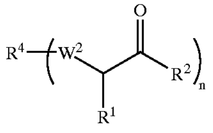

or (2)

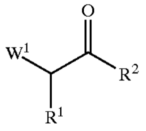

wherein for formula (1):

$R^1$ is hydrogen or an organic group, preferably hydrogen;

$R^2$ is an organic group, preferably an aliphatic group, more preferably a methyl group;

$W^2$ is an electron withdrawing group selected from the group consisting of —$O_2C$—, —(CO)—, —HN(CO)—, and —$NR^3$(CO)—; preferably $W^2$ is selected from the group consisting of —$O_2C$—, —HN(CO)—, and —$NR^3$(CO)—; wherein $R^3$ is an organic group;

$R^4$ is an organic group having valence n; and n is an integer greater than zero;

and wherein for formula (2):

$R^1$ is hydrogen or an organic group, preferably hydrogen;

$R^2$ is an organic group, preferably an aliphatic group, more preferably a methyl group; and $W^1$ is an electron withdrawing group selected from the group consisting of NC— and $H_2N$(CO)—.

Preferred β-ketone compound decomplexers may be described as acetoacetates and acetoacetamides. Preferred acetoacetate decomplexers have the formula:

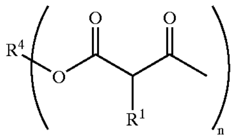

and preferred acetoacetamides decomplexers have the formulas:

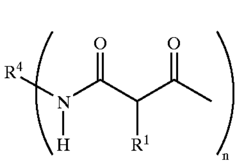

and

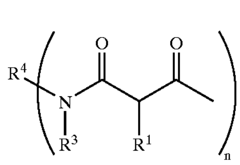

where the various substituents are as described above.

Preferred β-ketone compounds have β-ketone equivalent weights less than about 550 grams/mole. That is, preferred β-ketone decomplexing agents bearing a single β-ketone moiety (see formula 2) will have molecular weights less than about 550 grams/mole and preferred β-ketone deomplexing agents bearing "n" β-ketone groups (see formula 1) will have a molecular weight less than about 550×n grams/mole.

Specific β-ketone compounds of formula (1) include, for example, methyl acetoacetate, ethyl acetoacetate, t-butyl acetoacetate, 2-methacryloyloxyethyl acetoacetate, diethylene glycol bis(acetoacetate), polycaprolactone tris (acetoacetate), polypropylene glycol bis(acetoacetate), poly(styrene-co-allyl acetoacetate), N,N-dimethylacetoacetamide, N-methylacetoacetamide, acetoacetanilide, ethylene bis(acetoacetamide) and polypropylene glycol bis(acetoacetamide).

Specific β-ketone compounds of formula (2) include, for example, acetoacetamide and acetoacetonitrile.

Initiator systems and polymerizable compositions of the invention may optionally include more than one type of decomplexer. For example, the initiator systems and polymerizable compositions may comprise, in addition to a β-ketone compound decomplexer, one or more of the above-described decomplexers and/or other decomplexers, such as those comprising at least one anhydride group as reported in PCT Publication No. WO 97/17383. Of those decomplexers reported in PCT Publication No. WO 97/17383, particularly useful anhydrides include methacrylic anhydride, succinic anhydride, maleic anhydride, and glutaric anhydride, itaconic anhydride, and hexahydrophthalic anhydride. Preferably, the β-ketone compound decomplexer comprises at least about 10 weight % of the total decomplexer used. Most preferably, the β-ketone compound decomplexer comprises at least about 50 weight % of the total decomplexers used.

When the initiator system includes an organoborane amine complex, the decomplexer liberates organoborane from its amine complex by reacting with the amine, thereby removing the organoborane from complexation with the amine. Accordingly, the decomplexer is employed in an effective amount (i.e., an amount effective to promote polymerization by liberating organoborane from its amine complex, but without adversely affecting the material properties of the ultimate polymerized composition).

As recognizable to one of ordinary skill in the art, larger amounts of decomplexer may permit polymerization to proceed too quickly and, in the case of adhesives, the resulting materials may demonstrate inadequate adhesion to low energy surfaces. However, if not enough decomplexer is used, the rate of polymerization may be too slow and the resulting polymers may not be of adequate molecular weight for certain applications. However, a reduced amount of decomplexer may be helpful in slowing the rate of polymerization if it is otherwise too fast. Thus, within these parameters, in the case of organoborane amine complex initiators, the decomplexer is typically provided in an amount such that the ratio of amine-reactive groups in the decomplexer(s) (e.g., β-ketone groups, acid groups or anhydride groups) to amine groups is in the range of 0.5:1.0 to 10.0:1.0, preferably in the range of 1.0:1.0 to 7.0:1.0. It should be noted that the number of amine groups includes both primary and secondary amine groups.

Complexed Initiator

The organoborane initiates free-radical polymerization of the polymerizable monomer to form a polymer that can be useful as an bonding composition, for example an acrylic adhesive. The organoborane initiator may be represented by the following general formula:

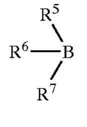

where $R^5$ is an alkyl group having 1 to about 10 carbon atoms. $R^6$ and $R^7$ may be the same or different and are independently selected from alkyl groups having 1 to about 10 carbon atoms and aryl groups. Preferably, $R^5$, $R^6$ and $R^7$ are independently selected from alkyl groups having 1 to about 5 carbon atoms. Accordingly, $R^5$, $R^6$ and $R^7$ may all be different, or more than one of $R^5$, $R^6$ and $R^7$ may be the same. Together, $R^5$, $R^6$ and $R^7$, along with the boron atom (B) to which they are attached, form the initiator. Specific organoborane initiators include, for example, trimethylborane, triethylborane, tri-n-propylborane, triisopropylborane, tri-n-butylborane, triisobutylborane, and tri-sec-butylborane.

Preferably, organoborane initiators are complexed with a complexing agent and may be represented by the following general formula:

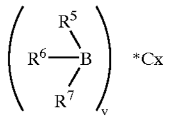

wherein $R^5$, $R^6$ and $R^7$ are as described above and wherein Cx is a complexing agent.

Complexing Agents:

Useful complexing agents (Cx) include, for example, amines, amidines, hydroxides and/or alkoxides. The ratio of boron atoms to complexing agent (Cx) in the complex is represented by "v" and is preferably selected so as to provide an effective ratio of the complexing agent and boron atoms. The boron atom to complexing agent ratio in the complex is preferably about 1:1. A boron atom to complexing agent ratio of greater than 1:1 could leave free organoborane, a material that tends to be pyrophoric.

Amine Complexing Agents:

Amine complexing agents (Cx) may be provided by a wide variety of materials having at least one amine group, including blends of different amines. Amine complexing agents may also be polyamines (i.e., materials having two or more amine groups such as two to four amine groups).

In one embodiment the amine complexing agent may be a primary or secondary monoamine, such as those represented by the structure:

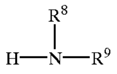

wherein $R^8$ and $R^9$ are independently selected from the group consisting of hydrogen and organic groups, preferably alkyl groups having 1 to 10 carbon atoms, alkylaryl groups in which the amine group is not directly attached to the aryl structure, and polyoxyalkylene groups. Alternatively, $R^8$ and $R^9$ together with the nitrogen atom to which they are attached may be joined to form a 4 to 7 membered heterocyclic ring. Particular examples of these amines include ammonia, ethylamine, butylamine, hexylamine, octylamine, benzylamine, morpholine, piperidine, pyrrolidine, and polyoxyalkylene monoamines (e.g., JEFFAMINES from Huntsman Chemical Company, such as M715 and M2005).

In another embodiment, the amine may be a polyamine such as those described by the structure:

$$R^9HN—R^{11}—NHR^9$$

wherein $R^9$ is as defined above and wherein $R^{11}$ is an organic group, preferably a divalent alkylene, arylene or alkylarylene group. Preferred among these materials are alkane diamines which may be branched or linear, and having the general structure:

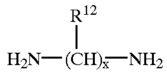

in which x is a whole number greater than or equal to 1, more preferably about 2 to 12, and each $R^{12}$ is independently a hydrogen or an alkyl group. Particularly preferred examples of alkane diamines include 1,2-ethanediamine, 1,3-propanediamine, 1,5-pentanediamine, 1,6-hexanediamine, 1,12-dodecanediamine, 2-methyl-1,5-pentanediamine, 3-methyl-1,5-pentanediamine, and isomers of these materials. While alkane diamines are preferred, other alkyl polyamines may be used such as triethylene tetraamine and diethylene triamine.

Useful polyamines may also be provided by a polyoxyalkylenepolyamine. Polyoxyalkylenepolyamines suitable in making complexes for the invention may be selected from the following structures:

$$H_2NR^{13}(R^{14}O)_w—(R^{15}O)_x—(R^{14}O)_y—R^{13}NH_2$$

(i.e., polyoxyalkylene diamines); or $$[H_2NR^{13}—(R^{14}O)_w]_z—R^{16}.$$

$R^{13}$, $R^{14}$ and $R^{15}$ are alkylene groups having 1 to 10 carbon atoms and may be the same or may be different. Preferably, $R^{13}$ is an alkylene group having 2 to 4 carbon atoms such as ethylene, n-propylene, iso-propylene, n-butylene or iso-butylene. Preferably, $R^{14}$ and $R^{15}$ are alkylene groups having 2 or 3 carbon atoms such as ethylene, n-propylene or iso-propylene. $R^{16}$ is the residue of a polyol used to prepare the polyoxyalkylenepolyamine (i.e., the organic structure that remains if the hydroxyl groups are removed). $R^{16}$ may be branched or linear, and substituted or unsubstituted (although substituents should not interfere with oxyalkylation reactions).

The value of w is $\geqq 1$, more preferably about 1 to 150, and most preferably about 1 to 20. The value of x and y are both $\geqq 0$. The value of z is >2, more preferably 3 or 4 (so as to provide, respectively, polyoxyalkylene triamines and tetraamines). It is preferred that the values of w, x, y and z be chosen such that the resulting complex is a liquid at room temperature ("room temperature" refers to, herein, a temperature of about 20 to 25° C.) as this simplifies handling and mixing thereof. Usually, the polyoxyalkylenepolyamine is itself a liquid. For the polyoxyalkylenepolyamine, molecular weights of less than about 5,000 may be used, although molecular weights of about 1,000 or less are more preferred, and molecular weights of about 140 to 1,000 are most preferred.

Examples of particularly preferred polyoxyalkylenepolyamines include polyethyleneoxidediamine, polypropyleneoxidediamine, polypropyleneoxidetriamine, diethyleneglycoldipropylamine, triethyleneglycoldipropylamine, polytetramethyleneoxidediamine, poly(ethyleneoxide-co-propyleneoxide)diamine, and poly(ethyleneoxide-co-propyleneoxide)triamine.

Examples of suitable commercially available polyoxyalkylenepolyamines include various JEFFAMINES from Huntsman Chemical Company such as the D, ED, and EDR series diamines (e.g., D-400, D-2000, D-5000, ED-600, ED-900, ED-2001, and EDR-148), and the T series triamines (e.g., T-403), as well as DCA-221 from Dixie Chemical Company.

As reported in U.S. Pat. No. 5,616,796 (Pocius et al.), the disclosure of which is incorporated herein by reference, the polyamine may also comprise the condensation reaction product of diprimary amine-terminated material (i.e., the two terminal groups are primary amine) and one or more materials containing at least two groups reactive with primary amine.

Hydroxide/Alkoxide Complexing Agents:

Hydroxide and/or alkoxide complexing agents (Cx) are reported in PCT Publication WO 01/32716 (Moren), the disclosure of which is incorporated herein by reference. Preferred hydroxide and/or alkoxide complexing agents may be represented by the formula:

$$({}^{(-)}O—R^{17})_n M^{(m+)}$$

wherein:

$R^{17}$ is independently selected from hydrogen or an organic group (e.g., alkyl or alkylene group);

$M^{(m+)}$ represents a countercation (e.g., sodium, potassium, tetraalkylammonium, or combinations thereof);

n is an integer greater than zero; and m is an integer greater than zero.

Amidine Complexing Agents:

Amidine complexing agents (Cx) are reported in PCT Publication WO 01/32717 (Moren), the disclosure of which is incorporated herein by reference. Preferred amidine complexing agents may be represented by the formula:

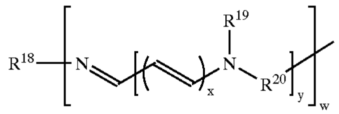

wherein:

$R^{18}$ is hydrogen or an organic group, preferably hydrogen or an alkyl or alkylene group;

$R^{19}$ and $R^{20}$ are independently a monovalent organic group or part of a cyclic structure; and w, x, and y comprise integers, preferably w being 1 and x being about 3 or less.

Particularly preferred amidine complexing agents comprise those selected from the group consisting of N,N,N',N'-tetramethylguanidine; 1,8-diazabicyclo[5.4.0]undec-7-ene; 1,5-diazabicyclo[4.3.0]non-5-ene; 2-methylimidazole; 2-methylimidazoline; and 4-(N,N-dimethylamino)-pyridine.

An organoborane complex may be readily prepared using known techniques. Typically, the complexing agent is combined with the organoborane in an inert atmosphere (e.g., a glovebox flushed with nitrogen to an environment having less than 100 ppm oxygen) with slow stirring. The organoborane can be added from a pressure equalizing dropping funnel to a flask into which the coupling agent has been previously weighed. An exotherm is often observed and cooling of the mixture is, therefore, recommended. Addition of the organoborane may be moderated to control the exotherm. If the ingredients have a high vapor pressure, it is desirable to keep the reaction temperature below about 70° to 80° C. Once the materials have been well mixed the complex is permitted to cool to room temperature. No special storage conditions are required although it is preferred that the complex be kept in a capped vessel in a cool, dark location. A crystalline mass of the complex can be heated (e.g., to about 55° C.) with an oil bath and outside of the nitrogen environment to liquify the complex and facilitate its transfer to the storage vial, which can be flushed with nitrogen.

The organoborane is employed in an effective amount, which is an amount large enough to permit acrylic monomer polymerization to readily occur to obtain an acrylic polymer of high enough molecular weight for the desired end use. If the amount of organoborane is too low, then the polymerization may be incomplete or, in the case of adhesives, the resulting composition may have poor adhesion. On the other hand, if the amount of organoborane is too high, then the polymerization may proceed too rapidly to allow for effective mixing and use of the resulting composition.

Large amounts of organoborane could potentially weaken the bond formed by a bonding composition of the present invention. The useful rate of polymerization will depend in part on the method of applying the composition to a substrate. Thus, a faster rate of polymerization may be accommodated by using a high speed automated industrial adhesive applicator rather than by applying the composition with a hand applicator or by manually mixing the composition.

Within these parameters, an effective amount of the organoborane is an amount that preferably provides about 0.003 to about 1.5%-wt. boron, more preferably about 0.008 to about 0.5%-wt. boron, most preferably about 0.01 to about 0.3%-wt. boron. The %-wt. of boron in a composition is based on the total weight of the composition, less fillers, non-reactive diluents, and other non-reactive materials. Thus, the polymerizable monomers, the vinyl aromatic compound, and organic thickener, (e.g., poly(methyl methacrylate) or core-shell polymer), if present, are included, but ingredients lacking abstractable hydrogen atoms or unsaturation are not. The %-wt. of boron in the composition may be calculated by the following equation:

$$\frac{\left(\begin{array}{c}\text{weight of organoborane}\\ \text{in the composition}\end{array}\right) \times \left(\begin{array}{c}\text{\%-wt. of boron}\\ \text{in the organoborane}\end{array}\right)}{\left(\begin{array}{c}\text{Total weight of the composition}\\ \text{less non-reactive components}\end{array}\right)}$$

Diluent

The initiator component may also contain any suitable diluent, or combination thereof, such as an aziridine-functional material (see, for example, PCT Publication No. WO 98/17694), 1,4-dioxo-2-butene functional material (see, for example, U.S. Pat. No. 6,252,023) or a vinyl aromatic compound (see, for example, PCT Publication WO 01/68783).

Generally, the diluent should not be reactive toward the complex and functions as an extender for the complex. Also advantageously, the diluent may generally increase the spontaneous combustion temperature of the initiator component.

The diluent should be generally soluble in monomers included in the polymerizable composition, such that the parts of the kit can be readily mixed. By "soluble" is meant that no evidence of gross phase separation at room temperature is visible to the unaided eye. Similarly, the organoborane amine complex should also be soluble in the diluent, although slightly warming a mixture of the complex and the diluent may be helpful in forming a solution of the two at room temperature. Accordingly, preferably, if used, the diluent is a liquid at or near room temperature (i.e., within about 10° C. of room temperature) or forms a liquid solution with the organoborane amine complex at or near room temperature.

The diluent is used in an effective amount. Generally, this is an amount of not more than about 50 weight %, preferably not more than about 25 weight %, more preferably not more than about 10 weight %, based on the total weight of the bonding composition.

Monomers

As stated previously, the initiator system of the invention can be used to initiate the polymerization of any suitable monomer(s). Broadly, the polymerizable composition includes at least one ethylenically unsaturated monomer capable of free radical polymerization. Numerous compounds containing ethylenic unsaturation can be used in the polymerizable composition. Preferably, the composition includes at least one (meth)acrylic monomer, most preferably a methacrylic monomer. As used herein the terms "(meth)acrylate" and "(meth)acrylic" and the plural forms thereof are meant to include both the acrylate and methacrylate species of the designated compound. For example, the term "ethyl (meth)acrylate" is meant to include ethyl acrylate and ethyl methacrylate. Particularly preferred are (meth)acrylic acid derivatives, such as those including esters and/or (meth)acrylamides. Suitable are, for example, the (meth)acrylic esters of monohydric alcohols, particularly alkanols having from 1 to 12 carbon atoms, such as methyl (meth)acrylate, ethyl (meth)acrylate, butyl (meth)acrylate, tetrahydrofurfuryl (meth)acrylate, and ethylhexyl (meth) acrylate; the (meth)acrylic acid esters of polyhydric alcohols, such as ethylene glycol, diethylene glycol, polyethylene glycol, and trimethylol propane; the di- and mono (meth)acrylic acid esters of glycerin; the di(meth)acrylic acid esters of triethylene glycol and tetraethylene glycol; the di(meth)acrylic acid esters of dipropylene glycol, tripropylene glycol, tetrapropylene glycol and pentapropylene glycol; and the di(meth)acrylic esters of ethoxylated or propoxylated diphenylolpropane.

Basically suitable are also polymerizable monomers, such as vinyl acetate; vinyl halides, such as vinyl chloride, vinyl fluoride, vinyl bromide; styrene; and divinyl-benzene. These compounds, however, are generally used only in subordinate amounts in the polymerizable compositions.

Further suitable are (meth)acrylamides, such as: N,N-dimethylacrylamide, N,N-diethylacrylamide, N-butylacrylamide, N-(acryloyl)morpholine, N-(acryloyl) piperidine, and similar compounds.

In general, the emphasis is on monomers with one or two olefinic double bonds in the molecule, preferably one olefinic double bond. The additional use of higher unsaturated components is not excluded, but it must be kept in mind that their presence can lead to embrittling of the polymerized compositions.

Additives

Bonding compositions of the present invention may also comprise optional additives. Such additives may be present in the polymerizable composition or in the initiator component of the kit. Thus, the polymerizable composition and initiator component may further comprise a variety of optional additives.

One particularly useful additive is a thickener, such as medium (about 40,000) molecular weight polybutyl methacrylate that may generally be incorporated in an amount of up to about 50 weight %, based on the total weight of the bonding composition. Thickeners may be employed to increase the viscosity of the resulting bonding composition to a more easily applied viscous syrup-like consistency.

Another particularly useful additive is an elastomeric material. These materials can improve the fracture toughness of bonding compositions made therewith, which can be beneficial when, for example, bonding stiff, high yield strength materials (e.g., metal substrates that do not mechanically absorb energy as easily as other materials, such as flexible polymeric substrates). Such additives can generally be incorporated in an amount of up to about 50% by weight, based on the total weight of the bonding composition.

Core-shell polymers can also be added to the bonding composition to modify spreading and flow properties of the bonding composition. These enhanced properties may be manifested by a reduced tendency for the bonding composition to leave an undesirable "string" upon dispensing from a syringe-type applicator, or sag or slump after having been applied to a vertical surface. Accordingly, use of more than about 20% by weight, based on total weight of the bonding composition, of a core-shell polymer additive may be desirable for achieving improved sag-slump resistance.

Small amounts of inhibitors, such as hydroquinone monomethyl ether and tris(N-nitroso-N-phenylhydroxylamine) aluminum salt may be used in the polymerizable compositions, for example, to prevent or reduce degradation of the monomers during storage. Inhibitors may be added in an amount that does not materially reduce the rate of polymerization or the ultimate properties of polymers made therewith. Accordingly, inhibitors are generally useful in amounts of about 100–10,000 ppm based on the total weight of the monomers in the polymerizable composition.

Other possible additives include non-reactive colorants, fillers (e.g., carbon black, hollow glass/ceramic beads, silica, titanium dioxide, solid glass/ceramic spheres, and chalk), and the like. The various optional additives are employed in any amount, but generally amounts that do not significantly adversely affect the polymerization process or the desired properties of polymers made therewith.

Still other additives include metal salt modifiers such as those reported, for example, in U.S. Ser. No. 10/037,058; "Metal Salt Modifiers For Bonding Compositions" (Moren)); filed on an even date herewith. Metal salts may be useful, for example, to modify the cure kinetics of the bonding composition to provide a favorable balance of long bonding composition worklife and fast rate of strength build. Preferred metal salts include those fitting the general formula:

$$[M^{a+}L_n][X^{-m}]_{a/m}$$

wherein: M is a metal cation having two chemically accessible oxidation states and having positive charge a, where a is an integer ranging from 1 to 6;

X is a counterion having charge −m, where m is an integer ranging from 1 to 3;

L is a covalently bonded ligand; and n is an integer ranging from 0 to 10 representing the number of ligands covalently bonded to the metal cation.

Metal salts are generally useful in amounts of 60–20,000 ppm based on the total weight of the bonding composition. Representative examples of metal salts include copper (II) bromide, copper (II) chloride, copper (II) 2-ethylhexanoate, iron (III) bromide, vanadium (III) bromide, chromium (III) bromide, ruthenium (III) bromide, copper (II) tetrafluoroborate, copper (II) trifluoromethanesulfonate, copper (II) naphthenate, copper (I) bromide, iron (II) bromide, manganese (II) bromide, cobalt (II) bromide, nickel (II) bromide, antimony (III) bromide, and palladium (II) bromide.

Bonding Compositions

The parts of the kits (i.e., the polymerizable composition and the initiator component) are blended as would normally be done when working with such materials. The initiator component is added to the polymerizable composition shortly before it is desired to use the bonding composition.

Once the parts of the kit have been combined to form a bonding composition, the composition should be used quickly, as the useful pot life may be short depending upon the monomers, the amount of the initiator component, the presence or absence and identity of metal salt modifiers, the temperature at which the bonding is to be performed, the presence or absence of crosslinking agents, and whether a diluent is used. Preferably, to improve bonding, it is desirable to keep the temperature below about 40° C.

The bonding composition is applied to one or both substrates to be bonded and then the substrates are joined together with pressure to force excess bonding composition out of the bond line. This also has the advantage of displacing bonding composition that has been exposed to air and that may have begun to oxidize. In general, the bonds should be made shortly after the bonding composition has been applied to the substrate(s), preferably within about 60 minutes. The typical bond line thickness is about 0.1 to 0.3 millimeters.

The bonds may cure (i.e., polymerize) to a reasonable green strength, i.e., to permit handling of such bonded articles within about 2–6 hours. Full bond strength will generally be reached in less than 24 hours under ambient conditions. However, post-curing with heat may be used, if desired.

In one preferred embodiment, the bonding compositions are coated on a low surface energy substrate. In another preferred embodiment, bonded articles comprise a first substrate and a second substrate (preferably at least one of which is a low surface energy polymeric material) adhesively bonded together by a layer of a bonding composition according to the invention.

The invention will be more fully appreciated with reference to the following nonlimiting examples.

EXAMPLES

These examples are merely for illustrative purposes only and are not meant to be limiting on the scope of the appended claims. All parts, percentages, ratios, etc. in the examples and the rest of the specification are by weight unless indicated otherwise.

TABLE of Abbreviations

| Trade Designation or Other Abbreviation | Description |
|---|---|
| ARCAL SAA 100 | poly(styrene-co-allyl alcohol), nominal Mn 1130, nominal Mw 2200, commercially available from ARCO Chemical Company; Newton Square, PA. |
| t-BuAcAc | t-butyl acetoacetate, commercially available from Aldrich Chemical Company; Milwaukee, WI. |
| UrethHALL 5450A-220 | poly(2-methyl-1,3-propylene glutarate-co-2,2-dimethyl-1,3-propylene glutarate), nominal MW 510, commercially available from C.P. Hall Company; Chicago, IL. |
| DEG | diethylene glycol, commercially available from Aldrich Chemical Company; Milwaukee, WI. |
| PCL triol | polycaprolactone triol, nominal molecular weight 300, commercially available from Aldrich Chemical Company; Milwaukee, WI. (catalog #20,038-7). |
| ARCOL PPG2025 | polypropylene glycol, nominal molecular weight 2000, commercially available from ARCO Chemical Company; Newton Square, PA. |
| TMI | 3-isopropenyl-α,α-dimethylbenzylisocyanate, commercially available from Cytec Industries, Inc.; West Peterson, NJ. |
| Jeffamine D2000 | amine terminated polypropylene glycol, nominal molecular weight 2000, commercially available from Huntsman Petrochemical Corp; Houston, TX. |
| triethylborane | Commercially available from Aldrich Chemical Company; Milwaukee, WI. |
| 1,6-hexanediamine | Commercially available from Aldrich Chemical Company; Milwaukee, WI. |
| Blendex 360 | core-shell toughener, commercially available from GE Specialty Chemicals; Parkersburg, WV. |
| THFMA | tetrahydrofurfuryl methacrylate, commercially available from Sartomer Company; Exton, PA. |
| DBI | dibutyl itaconate, commercially available from Aldrich Chemical Company; Milwaukee, WI. |
| Z-Light W1600 | ceramic microspheres (100–350 micron diameter), commercially available from 3M Company; St. Paul, MN. |
| MAEAcAc | 2-methacryloyloxyethyl acetoacetate, commercially available from Aldrich Chemical Company; Milwaukee, WI. |
| ethyl acetoacetate | Commercially available from Aldrich Chemical Company; Milwaukee, WI. |
| 2,4-pentanedione | Commercially available from Aldrich Chemical Company; Milwaukee, WI. |
| 4-hydroxycoumarin | Commercially available from Aldrich Chemical Company; Milwaukee, WI. |
| PhNHAcAc | acetoacetanilide, Commercially available from Aldrich Chemical Company; Milwaukee, WI. |
| 2-hydroxyethyl methacrylate | Commercially available from Aldrich Chemical Company; Milwaukee, WI. |
| 2,6-di-t-butyl-4-methylphenol | Commercially available from Aldrich Chemical Company; Milwaukee, WI. |

-continued

TABLE of Abbreviations

| Trade Designation or Other Abbreviation | Description |
|---|---|
| dibutyltin dilaurate | Commercially available from Aldrich Chemical Company; Milwaukee, WI. |
| 2,4-Tolylenediisocyanate terminated polypropylene glycol | #43,348-9, nominal molecular weight 1000, commercially available from Aldrich Chemical Company; Milwaukee, WI. |
| copper (II) bromide | available from Strem Chemical Company, Newburyport, MA. |
| N,N-dimethylacrylamide | available from Alfa-Aesar Company, Ward Hill, MA. |
| HHPhAnh | hexahydrophthalic anhydride, available from Aldrich Chemical Company. |
| dibutyl maleate | Available from C.P. Hall Company, Chicago, IL. |

Adhesive Test Methods

Overlap Shear Bond Strength Test Method

Each bonding composition was applied directly onto an untreated 2.5 cm×10 cm×0.3 cm (1 inch×4 inch×0.125 inch) test panel and an untreated second test panel was immediately placed against the bonding composition on the first test panel so that the overlapped area was 1.3 cm×2.5 cm (0.5 inch×1 inch). A clamp was applied to the overlapped area. The test panels were high-density polyethylene (HDPE) (Minnesota Plastics; Minneapolis, Minn.). A small amount of bonding composition squeezed out of the overlapped area and was allowed to remain.

The bonds were allowed to cure for at least 48 hours at 22° C. The clamps were then removed, and the overlap bonds were tested in shear (OLS) on a tensile tester at a crosshead speed of 1.27 cm/minute (0.5 inch/minute). The overlap shear values were recorded in pounds per square inch and were converted into megapascals (MPa). Overlap shear values represent the average of three replicates.

Worklife Test Method

This test measures overlap shear bond strength as a function of adhesive air exposure time prior to bond formation. The Overlap Shear Bond Strength Test Method above was followed, except that a bare second test panel was not immediately pressed into the adhesive laden first test panel, rather each bonding composition was applied directly onto an untreated test panel, the assembly was allowed to stand in air for the Open Time stated in the Examples, and then an untreated second test panel was placed against the air-aged bonding composition on the first test panel to provide an overlapped area. The maximum Open Time resulting in either 1) substrate yield without bond rupture or 2) bond rupture exhibiting 100% cohesive failure of the adhesive and resulting in an overlap shear value which is at least 95% of the overlap shear value measured according to the Overlap Shear Bond Strength Test Method above defines adhesive Worklife (also referred to as "WL"). Overlap shear values represent the average of two replicates.

Rate of Overlap Shear Bond Strength Increase Test Method

This test measures overlap shear bond strength of partially cured bonding composition as a function of cure time. The Overlap Shear Bond Strength Test Method above was followed, except that the bonds were not allowed to cure for at least 48 hours at 22° C., rather the bonds were allowed to cure at 22° C. for the time specified in the Examples. The clamps were then removed, and the overlap bonds were tested in shear. The time to reach 50 psi (0.34 MPa) overlap shear strength was estimated graphically and is reported as "T50". Overlap shear values represent the average of two replicates.

Hot Water Soak Overlap Shear Bond Strength Retention Test Method

This test measures overlap shear bond strength after hot water soak. The Overlap Shear Bond Strength Test Method above was followed, except that the bonds were not tested immediately after curing for at least 48 hours at 22° C. Rather the bonds were allowed to cure for at least 48 hours at 22° C., the clamps were removed, the bonds were submerged in 70° C. water for 6 days, then the overlap bonds were tested in shear.

Peel Bond Strength Test Method

Each bonding composition was applied directly onto an untreated 0.8 mm (30 mil)-thick high-density polyethylene (HDPE) film (Cadillac Plastics; Minneapolis, Minn.). A second untreated HDPE film was pressed into the bonding composition and held in contact using a 1.2 kg (2.7 lb) weighted glass plate. Sufficient bonding composition was applied to the first film to provide minimum bond dimensions of 2.5 cm (1 inch) in width by 5 cm (2 inch) in length.

The bonded adherends were allowed to cure for 24 hours at 22° C. The samples were uncovered and allowed to cure at least 24 hours additionally at 22° C., then tested for bond strength in the T-peel mode using a tensile tester set at a crosshead speed of 10.2 cm/min (4 inches/min). Two overlapping free ends of the sample were clamped into the jaws of the tensile tester, one free end in the upper jaw and one free end in the lower jaw. The jaws were then pulled apart until at least 2.5 cm (1 inch) of adhesive was exposed or until adherend failure was observed. The average force per width during the run after the adhesive was initially exposed was recorded as the peel strength in pounds per inch and was converted into Newtons/cm (N/cm).

β-Ketone Functional Oligomer and Polymer Synthesis

Synthesis Example S1—Poly(styrene-co-allyl acetoacetate) Synthesis

ARCAL SAA100 (57.80 grams, 0.20 equivalents OH) and t-butyl acetoacetate (31.60 grams, 0.20 mole) were combined and heated to a 200° C. endpoint. t-Butyl alcohol distilled and was collected (14.35 grams, 97% of theoretical). The poly(styrene-co-allyl acetoacetate) product cooled to a clear, hard glass. The adduct is hereinafter referred to "p(Sty-AAcAc)".

Synthesis Examples S2–S5

Synthesis Example S1 was repeated, but using various polyols in place of ARCAL SAA100 as shown in Table 1. t-Butyl alcohol recovery was greater than 95% of theoretical in each case. Synthesis Example S2-S5 acetoacetate functional oligomer products were moderately viscous liquids.

TABLE 1

| Synthesis Example | Polyol | Weight (grams) | Weight tBuAcAc (grams) | Adduct Designation |
|---|---|---|---|---|
| S2 | UrethHALL5450A-220 | 48.66 | 31.60 | "5450AcAc2" |
| S3 | DEG | 10.60 | 31.60 | "DEGAcAc2" |
| S4 | PCL triol | 20.00 | 31.60 | "PCLAcAc3" |
| S5 | ARCOL PPG2025 | 1020.0 | 161.90 | "PPGAcAc2" |

α-Methylstyrene Functional Oligomer Synthesis

Synthesis Example S6

TMI (120.60 grams, 0.60 mole) and Jeffamine D2000 (600.00 grams, 0.60 equivalents $NH_2$) were combined and allowed to react without external temperature control. After standing at room temperature overnight, infrared spectroscopy indicated complete reaction by disappearance of the 2265 $cm^{-1}$ isocyanate band. The α-methylstyrene functional oligomer product is hereinafter referred to as "AMSPU2400".

Methacrylate Terminated Polyurethane Synthesis

Synthesis Example S7

2,4-Tolylenediisocyanate terminated polypropylene glycol (493.00 grams, 1.00 isocyanate equivalents), 2-hydroxyethyl methacrylate (143.14 grams, 1.10 mole), 2,6-di-t-butyl-4-methylphenol (0.06 grams), and dibutyltin dilaurate (0.30 grams) were combined sequentially and allowed to react without external temperature control for one hour, then heated to 70° C. for four hours. Infrared spectroscopy indicated complete reaction by disappearance of the 2265 $cm^{-1}$ isocyanate band. The methacrylate terminated polyurethane product is hereinafter referred to as "PUMA1250".

Examples 1–15

Initiator Component A

A 2:1 mole ratio triethylborane: 1,6-hexanediamine complex (32.00 grams) was dissolved in AMSPU2400 (168.00 grams). The air bubbles in the Initiator Component were allowed to rise and escape. This Initiator Component is hereafter referred to as "Initiator Component A".

Polymerizable Composition

A slurry containing Blendex 360 (187.50 grams), THFMA (442.50 grams), DBI (56.25 grams), and AMSPU2400 (37.50 grams) was allowed to stand at 70° C. for 2 hours. The resultant opaque dispersion was allowed to cool and then sheared aggressively with a saw-toothed blade of a laboratory dispersator, available from Premier Mill Corporation; Reading, Pa. Z-Light W1600 (15.00 grams) was added to the warm dispersion and mixed well. This polymerizable composition is hereinafter referred to as "Monomer Blend A".

A portion of the Monomer Blend A was combined with MAEAcAc or other β-ketone decomplexing agents as described in Table 2. Air bubbles were removed from the Polymerizable Compositions by briefly stirring under vacuum.

Adhesive

Each Polymerizable Composition and Initiator Component A were packaged in a 10:1 volume ratio dual syringe applicator (MixPac System 50, Kit No. MP-050-10-09, available from ConProTec; Salem, N.H.), the larger cylinder holding the Polymerizable Composition and the smaller cylinder holding Initiator Component A. The two parts were combined by simultaneous extrusion through a 10 cm (4 inch) long, 17-stage static mix nozzle (Part No. MX 4-0-17-5, ConProtec). Test specimens were prepared and tested according to the Test Methods outlined above, the results are summarized in Table 3. In Table 4 the time to 50 psi (0.34 MPa) HDPE OLS (T50), Worklife (WL) and the T50/WL ratio were estimated for Examples 1–15.

TABLE 2

| Example | β-Ketone Decomplexer | Weight Monomer Blend A (grams) | Weight Decomplexer (grams) |
|---|---|---|---|
| 1 | MAEAcAc | 45.83 | 4.17 |
| 2 | ethyl acetoacetate | 49.33 | 0.67 |
| 3 | MAEAcAc | 48.90 | 1.10 |
| 4 | p(Sty-AAcAc) | 48.09 | 1.91 |
| 5 | ethyl acetoacetate | 46.40 | 3.60 |
| 6 | 5450AcAc2 | 48.32 | 1.68 |
| 7 | 5450AcAc2 | 41.61 | 8.39 |
| 8 | DEGAcAc2 | 49.30 | 0.70 |
| 9 | DEGAcAc2 | 46.49 | 3.51 |
| 10 | PCLAcAc3 | 49.06 | 0.94 |
| 11 | PCLAcAc3 | 45.28 | 4.72 |
| 12 | p(Sty-AAcAc) | 44.26 | 5.74 |
| 13 | 2,4-pentanedione | 47.43 | 2.57 |
| 14 | 4-hydroxycoumarin | 49.17 | 0.83 |
| 15 | Acetoacetanilide | 49.09 | 0.91 |

TABLE 3

| Example | HDPE T-peel (N/cm) | HDPE OLS (MPa) | OLS @ 10 min Open Time (MPa) | OLS @ 20 min Open Time (MPa) | OLS @ 30 min Open Time (MPa) | OLS at 90 minutes cure (MPa) | OLS at 120 minutes cure (MPa) | OLS at 150 minutes cure (MPa) |
|---|---|---|---|---|---|---|---|---|
| 1 | SB | 6.74 | 6.71 | 3.10 | 3.90 | 0.67 | NT | NT |
| 2 | 49 | 4.50 | 4.79 | 2.59 | 1.95 | 0.01 | 0.16 | 0.18 |
| 3 | 77 | 4.49 | 3.91 | 1.34 | 1.02 | 0.10 | 0.15 | 0.24 |
| 4 | 51 | 5.43 | 5.36 | 5.42 | 5.43 | 0.01 | 0.03 | 0.12 |
| 5 | 54 | 5.30 | 5.67 | 5.18 | 4.43 | 0.19 | 0.33 | 0.45 |
| 6 | 63 | 6.45 | 5.82 | 5.21 | 2.79 | 0.04 | 0.10 | 0.29 |
| 7 | 53 | 5.08 | 5.28 | 4.41 | 1.68 | 0.20 | 0.43 | 0.54 |

TABLE 3-continued

| Example | HDPE T-peel (N/cm) | HDPE OLS (MPa) | OLS @ 10 min Open Time (MPa) | OLS @ 20 min Open Time (MPa) | OLS @ 30 min Open Time (MPa) | OLS at 90 minutes cure (MPa) | OLS at 120 minutes cure (MPa) | OLS at 150 minutes cure (MPa) |
|---|---|---|---|---|---|---|---|---|
| 8 | 39 | 6.42 | 6.01 | 3.66 | 5.11 | 0.10 | 0.14 | 0.40 |
| 9 | 82 | 6.39 | 6.14 | 5.78 | 4.33 | 0.21 | 0.36 | 0.43 |
| 10 | 46 | 6.50 | 5.61 | 4.79 | 4.67 | 0.07 | 0.12 | 0.30 |
| 11 | 72 | 6.48 | 6.12 | 5.66 | 3.28 | 0.17 | 0.31 | 0.76 |
| 12 | 51 | 5.37 | 5.72 | 5.99 | 5.39 | 0.05 | 0.07 | 0.09 |
| 13 | 72 | 4.61 | 4.68 | 1.46 | 4.37 | 0.08 | 0.20 | 0.32 |
| 14 | SB | 6.79 | 6.42 | 6.56 | 4.79 | 0.27 | 0.41 | 0.77 |
| 15 | 63 | 6.66 | 5.50 | 3.31 | 2.08 | 0.28 | 0.39 | 0.57 |

NT signifies that performance was not tested,
SB signifies that the substrate broke

TABLE 4

| Example | T50 (minutes) | Worklife (minutes) | T50/WL ratio |
|---|---|---|---|
| 1 | 72 | 10 | 7/1 |
| 2 | 180 | 10 | 18/1 |
| 3 | 172 | 10 | 17/1 |
| 4 | 202 | 30 | 7/1 |
| 5 | 123 | 20 | 6/1 |
| 6 | 156 | 30 | 5/1 |
| 7 | 120 | 20 | 6/1 |
| 8 | 145 | 30 | 5/1 |
| 9 | 132 | 20 | 7/1 |
| 10 | 156 | 30 | 5/1 |
| 11 | 120 | 20 | 6/1 |
| 12 | 243 | 30 | 8/1 |
| 13 | 154 | <10 | >15/1 |
| 14 | 107 | <10 | >11/1 |
| 15 | 110 | <10 | >11/1 |

TABLE 5

| Example | Decomplexer Identity | Weight Monomer Blend B (grams) | Weight Decomplexer (grams) |
|---|---|---|---|
| 16 | ethyl acetoacetate | 49.33 | 0.67 |
| 17 | MAEAcAc | 48.90 | 1.10 |
| 18 | p(Sty-AAcAc) | 48.09 | 1.91 |

Each Polymerizable Composition above was packaged opposite Initiator Component A of Examples 1–15. Test specimens were prepared and tested according to the Test Methods outlined above. The results are summarized in Table 6. In Table 7 the time to 50 psi (0.34 MPa) HDPE OLS (T50), Worklife (WL) and the T50/WL ratio were estimated for Examples 16–18.

TABLE 6

| Example | HDPE T-peel (N/cm) | HDPE OLS (MPa) | OLS @ 10 min Open Time (MPa) | OLS @ 20 min Open Time (MPa) | OLS @ 30 min Open Time (MPa) | OLS at 90 min cure (MPa) | OLS at 120 min cure (MPa) | OLS at 150 min cure (MPa) |
|---|---|---|---|---|---|---|---|---|
| 16 | 18 | 6.12 | 1.31 | 3.08 | 1.72 | 0.13 | 0.27 | 0.43 |
| 17 | 2 | 6.00 | 4.66 | 0.56 | 0.06 | 0.18 | 0.21 | 0.23 |
| 18 | SB | 6.83 | 6.79 | 6.74 | 6.68 | 0.24 | 0.27 | 0.38 |

SB signifies that the substrate broke

Examples 16–18

A slurry containing Blendex 360 (187.50 grams), THFMA (442.50 grams), DBI (56.25 grams), and PUMA1250 (37.50 grams) was allowed to stand at 70° C. for 2 hours. The resultant opaque dispersion was allowed to cool and then sheared aggressively with a saw-toothed blade of a laboratory dispersator. Z-Light W1600 (15.00 grams) was subsequently added to the warm dispersion and mixed well. This polymerizable composition is hereinafter referred to as "Monomer Blend B".

Polymerizable Compositions were prepared as in Examples 1–15, except replacing Monomer Blend A with Monomer Blend B, and using the β-ketone decomplexer whose identity and amount used is shown in Table 5.

TABLE 7

| Example | T50 (minutes) | WL (minutes) | T50/WL ratio |
|---|---|---|---|
| 16 | 135 | <10 | >13/1 |
| 17 | ND | <10 | ND |
| 18 | 159 | 30 | 5/1 |

ND signifies that a value was not determined

Hot Water Soak Overlap Shear Bond Strength Retention

The adhesives of Example 1 and Example 18 were tested as described in the Hot Water Soak Overlap Shear Bond Strength Retention Test Method. The results are summarized in Table 8.

TABLE 8

| Example | HDPE OLS After 6 Days 70° C. Water Soak (MPa) |
|---|---|
| 1 | 6.66 |
| 18 | 6.60 |

Examples 19–28

Polymerizable Composition

A slurry containing Blendex 360 (202.50 grams), THFMA (511.50 grams), and AMSPU2400 (19.50 grams) was allowed to stand at 70° C. for 2 hours. The resultant opaque dispersion was allowed to cool and then sheared aggressively with a saw-toothed blade of a laboratory dispersator, available from Premier Mill Corporation; Reading, Pa. Z-Light W1600 (16.50 grams) was added to the warm dispersion and mixed well. This monomer blend is hereinafter referred to as "Monomer Blend C".

A slurry of copper (II) bromide (4.00 grams) in dimethylacrylamide (4.00 grams) was heated to form a homogeneous black solution. This copper (II) bromide solution is hereinafter referred to as "Metal Salt Solution A". In some Examples a second copper (II) bromide solution, "Metal Salt Solution B", was used. Metal Salt Solution B was prepared by combining 0.20 grams of Metal Salt Solution A with 0.80 grams dimethylacrylamide.

To prepare each example, Monomer Blend C was combined with MAEAcAc and a portion of Metal Salt Solution A or Metal Salt Solution B to form a Polymerizable Composition as described in Table 9. Air bubbles were removed from the Polymerizable Composition by briefly stirring under vacuum.

Adhesive

Each Polymerizable Composition and Initiator Component A were packaged in a 10:1 volume ratio dual syringe applicator (MixPac System 50, Kit No. MP-050-10-09, available from ConProTec; Salem, N.H.), the larger cylinder holding the Polymerizable Composition and the smaller cylinder holding the Initiator Component. The two parts were combined by simultaneous extrusion through a 10 cm (4 inch) long, 17-stage static mix nozzle (Part No. MX 4-0-17-5, ConProTec). Test specimens were prepared and tested according to the Test Methods outlined above, the results are presented in Tables 10–12. In Table 13 the time to 0.34 MPa HDPE OLS (T50), Worklife (WL) and the T50/WL ratio were estimated for Examples 19–28.

TABLE 9

| Example | Weight Monomer Blend C (grams) | Weight MAEAcAc (grams) | Weight (grams) and Identity of Metal Salt Solution | Copper (II) Bromide Concentration in Polymerizable Composition (PPM) |
|---|---|---|---|---|
| 19 | 45.77 | 4.18 | 0.05 Metal Salt Solution A | 500 |
| 20 | 45.79 | 4.18 | 0.03 Metal Salt Solution B | 60 |
| 21 | 45.76 | 4.18 | 0.06 Metal Salt Solution B | 120 |
| 22 | 45.70 | 4.18 | 0.12 Metal Salt Solution B | 240 |
| 23 | 45.72 | 4.18 | 0.10 Metal Salt Solution A | 1000 |
| 24 | 45.62 | 4.18 | 0.20 Metal Salt Solution A | 2000 |
| 25 | 44.82 | 4.18 | 1.00 Metal Salt Solution A | 10,000 |
| 26 | 43.82 | 4.18 | 2.00 Metal Salt Solution A | 20,000 |
| 27 | 41.82 | 4.18 | 4.00 Metal Salt Solution A | 40,000 |
| 28 | 37.82 | 4.18 | 8.00 Metal Salt Solution A | 80,000 |

TABLE 10

| Example | HDPE OLS (MPa) | PP OLS (MPa) |
|---|---|---|
| 19 | 6.69 | NT |
| 20 | 5.89 | 1.90 |
| 21 | 6.12 | 1.54 |
| 22 | 6.09 | 1.72 |
| 23 | 6.39 | NT |
| 24 | 6.78 | 1.66 |
| 25 | 5.86 | NT |
| 26 | 5.94 | NT |
| 27 | 0.73 | NT |
| 28 | 0.21 | NT |

NT signifies that performance was not tested.

TABLE 11

| Example | OLS at 10 min Open Time (MPa) | OLS at 20 min Open Time (MPa) | OLS at 30 min Open Time (MPa) | OLS at 40 min Open Time (MPa) | OLS at 45 min Open Time (MPa) | OLS at 50 min Open Time (MPa) | OLS at 60 min Open Time (MPa) |
|---|---|---|---|---|---|---|---|
| 19 | 6.09 | 6.63 | 6.61 | 6.63 | NT | 6.15 | 6.09 |
| 20 | 5.62 | 2.54 | 0.49 | NT | NT | NT | NT |
| 21 | 6.10 | 5.99 | 2.41 | NT | NT | NT | NT |
| 22 | 5.93 | 6.11 | 6.08 | 2.62 | NT | NT | NT |
| 23 | 6.66 | 6.63 | 6.63 | 6.64 | NT | 6.61 | 6.54 |
| 24 | 6.66 | 6.31 | 6.04 | NT | NT | 6.61 | 6.48 |
| 25 | NT | NT | 6.00 | NT | 6.03 | NT | 5.92 |
| 26 | NT | NT | 5.68 | NT | 5.99 | NT | 5.97 |

TABLE 11-continued

| Example | OLS at 10 min Open Time (MPa) | OLS at 20 min Open Time (MPa) | OLS at 30 min Open Time (MPa) | OLS at 40 min Open Time (MPa) | OLS at 45 min Open Time (MPa) | OLS at 50 min Open Time (MPa) | OLS at 60 min Open Time (MPa) |
|---|---|---|---|---|---|---|---|
| 27 | NT | NT | 2.76 | NT | 2.52 | NT | 1.50 |
| 28 | NT | NT | 0.50 | NT | 0.89 | NT | 0.63 |

NT signifies that performance was not tested.

TABLE 12

| Example | OLS at 45 min. cure (MPa) | OLS at 60 min. cure (MPa) | OLS at 75 min. cure (MPa) | OLS at 90 min. cure (MPa) | OLS at 105 min. cure (MPa) | OLS at 120 min. cure (MPa) | OLS at 135 min. cure (MPa) | OLS at 150 min. cure (MPa) | OLS at 165 min. cure (MPa) | OLS at 180 min. cure (MPa) |
|---|---|---|---|---|---|---|---|---|---|---|
| 19 | 0 | 0.03 | 0.12 | 0.62 | 2.70 | NT | NT | NT | NT | NT |
| 20 | 0.14 | 0.20 | 0.55 | 1.08 | 1.64 | NT | NT | NT | NT | NT |
| 21 | 0.05 | 0.11 | 0.36 | 0.70 | 1.26 | NT | NT | NT | NT | NT |
| 22 | 0 | 0.06 | 0.23 | 0.92 | 1.59 | NT | NT | NT | NT | NT |
| 23 | 0.01 | 0.03 | 0.15 | 0.84 | 1.63 | NT | NT | NT | NT | NT |
| 24 | NT | 0.01 | NT | NT | 0.17 | 0.66 | 2.92 | NT | NT | NT |
| 25 | NT | NT | NT | NT | 0.01 | 0.04 | 0.09 | 0.17 | 0.22 | 0.90 |
| 26 | NT | NT | NT | NT | 0.09 | 0.12 | 0.26 | 0.31 | 0.39 | 0.92 |
| 27 | NT | NT | NT | NT | NT | NT | NT | NT | NT | NT |
| 28 | NT | NT | NT | NT | NT | NT | NT | NT | NT | NT |

NT signifies that performance was not tested.

TABLE 13

| Example | Worklife (minutes) | T50 (minutes) | T50/WL ratio |
|---|---|---|---|
| 19 | 60 | 84 | 1.4/1 |
| 20 | 10 | 65 | 6.5/1 |
| 21 | 20 | 75 | 3.8/1 |
| 22 | 30 | 84 | 2.8/1 |
| 23 | 60 | 84 | 1.4/1 |
| 24 | 60 | 108 | 1.8/1 |
| 25 | 60 | 168 | 2.8/1 |
| 26 | 60 | 158 | 2.6/1 |
| 27 | ND | ND | ND |
| 28 | ND | ND | ND |

ND signifies that a value was not determined

Examples 29–51

Different metal salt solutions were prepared as described in Table 14 according to the metal salt solution preparation description presented in Examples 19–28 above. All metal salts are commercially available from Strem Chemical Company Newburyport, Mass.

TABLE 14

| Metal Salt Solution Designation | Weight Metal Salt (grams) and Identity of Metal Salt | Weight Dimethylacrylamide (grams) |
|---|---|---|
| Metal Salt Solution C | 4.00 $CuCl_2$—$2H_2O$ | 8.00 |
| Metal Salt Solution D | 4.00 $Cu(O_2CCH(Et)(CH_2)_3CH_3)_2$ | 4.00 |
| Metal Salt Solution E | 4.00 $FeBr_3$ | 4.00 |
| Metal Salt Solution F | 4.00 $FeCl_3$ | 6.00 |
| Metal Salt Solution G | 0.50 $VBr_3$ | 1.50 |
| Metal Salt Solution H | 0.50 $CrBr_3$—$6H_2O$ | 1.50 |
| Metal Salt Solution I | 0.50 $RuBr_3$—$xH_2O$ | 1.50 |
| Metal Salt Solution J | 0.50 $Cu(BF_4)_2$ | 1.50 |
| Metal Salt Solution K | 0.50 $Cu(O_3SCF_3)_2$ | 1.50 |
| Metal Salt Solution L | 0.50 $Cu(naphthenate)_2$ | 1.50 |
| Metal Salt Solution M | 1.00 CuBr | 9.00 |
| Metal Salt Solution N | 1.00 $FeBr_2$ | 2.00 |
| Metal Salt Solution O | 0.50 $MnBr_2$ | 1.50 |
| Metal Salt Solution P | 0.50 $CoBr_2$—$xH_2O$ | 1.50 |
| Metal Salt Solution Q | 0.50 $NiBr_2$—$xH_2O$ | 1.50 |
| Metal Salt Solution R | 0.50 $SbBr_3$ | 1.50 |
| Metal Salt Solution S | 0.50 $PdBr_2$ | 9.50 |

Polymerizable Compositions were prepared as in Examples 19–28 except replacing Metal Salt Solution A with varying amounts of Metal Salt Solution C to S. Each Polymerizable Composition was packaged opposite Initiator Component A, as Examples 19–28. Test specimens were prepared and tested according to the Test Methods outlined above. The results are summarized in Tables 16–20. In Table 11 the time to 0.34 MPa (50 psi) HDPE OLS (T50), Worklife (WL) and the T50/WL ratio were estimated for Examples 29–51.

TABLE 15

| Example | Weight Monomer Blend C (grams) | Weight MAEAcAc (grams) | Weight (grams) and Identity of Metal Salt Solution |
|---|---|---|---|
| 29 | 45.59 | 4.18 | 0.23 Metal Salt Solution C |
| 30 | 45.50 | 4.18 | 0.32 Metal Salt Solution D |
| 31 | 45.55 | 4.18 | 0.27 Metal Salt Solution E |
| 32 | 45.64 | 4.18 | 0.18 Metal Salt Solution F |
| 33 | 45.30 | 4.18 | 0.52 Metal Salt Solution G |
| 34 | 45.10 | 4.18 | 0.72 Metal Salt Solution H |
| 35 | 45.12 | 4.18 | 0.70 Metal Salt Solution I |
| 36 | 45.39 | 4.18 | 0.43 Metal Salt Solution J |
| 37 | 45.17 | 4.18 | 0.65 Metal Salt Solution K |
| 38 | 44.72 | 4.18 | 1.10 Metal Salt Solution L |
| 39 | 45.17 | 4.18 | 0.65 Metal Salt Solution M |
| 40 | 44.52 | 4.18 | 1.30 Metal Salt Solution M |
| 41 | 45.53 | 4.18 | 0.29 Metal Salt Solution N |
| 42 | 45.38 | 4.18 | 0.44 Metal Salt Solution N |
| 43 | 45.76 | 4.18 | 0.06 Metal Salt Solution E |
| 44 | 45.74 | 4.18 | 0.08 Metal Salt Solution I |
| 45 | 45.70 | 4.18 | 0.12 Metal Salt Solution L |
| 46 | 45.75 | 4.18 | 0.03 Metal Salt Solution N |
| 47 | 45.43 | 4.18 | 0.39 Metal Salt Solution O |
| 48 | 45.33 | 4.18 | 0.49 Metal Salt Solution P |
| 49 | 45.33 | 4.18 | 0.49 Metal Salt Solution Q |
| 50 | 45.17 | 4.18 | 0.65 Metal Salt Solution R |
| 51 | 43.42 | 4.18 | 2.40 Metal Salt Solution S |

TABLE 16

| Example | HDPE OLS (Mpa) | PP OLS (MPa) |
|---|---|---|
| 29 | 6.70 | 1.20 |
| 30 | 6.14 | 0.37 |
| 31 | 6.78 | 1.66 |
| 32 | 3.86 | 4.14 |
| 33 | 5.86 | NT |
| 34 | 5.61 | NT |
| 35 | 1.77 | NT |
| 36 | 5.68 | NT |
| 37 | 5.75 | NT |
| 38 | 1.61 | NT |
| 39 | 5.89 | NT |
| 40 | 5.94 | NT |
| 41 | 3.03 | NT |
| 42 | 1.86 | NT |
| 43 | 5.97 | NT |
| 44 | 5.93 | NT |
| 45 | 5.48 | NT |
| 46 | 5.85 | NT |
| 47 | 5.69 | NT |
| 48 | 3.14 | NT |
| 49 | 2.66 | NT |
| 50 | 5.92 | NT |
| 51 | 5.83 | NT |

NT signifies that performance was not tested

TABLE 17

| Example | OLS at 10 min Open Time (MPa) | OLS at 20 min Open Time (MPa) | OLS at 30 min Open Time (MPa) | OLS at 40 min Open Time (MPa) | OLS at 45 min Open Time (MPa) | OLS at 50 min Open Time (MPa) | OLS at 60 min Open Time (MPa) |
|---|---|---|---|---|---|---|---|
| 29 | 6.71 | 6.30 | 6.53 | 6.61 | NT | 5.19 | 3.79 |
| 30 | 4.76 | 5.25 | 4.78 | 4.59 | NT | 3.17 | 1.78 |
| 31 | 6.31 | 2.82 | NT | NT | NT | NT | NT |
| 32 | 6.40 | 3.97 | NT | NT | NT | NT | NT |
| 33 | 3.77 | 4.01 | 1.26 | NT | NT | NT | NT |
| 34 | 5.63 | 3.41 | 2.12 | NT | NT | NT | NT |
| 35 | 2.29 | 1.67 | 1.37 | NT | 1.45 | NT | 1.53 |
| 36 | 4.16 | 2.39 | 0.58 | NT | 1.68 | NT | NT |
| 37 | 3.19 | 0.96 | 0.08 | NT | NT | NT | NT |
| 38 | 1.22 | 0.40 | 0.19 | NT | 0.34 | NT | NT |
| 39 | 5.89 | 5.97 | 5.92 | NT | 5.80 | NT | 5.81 |
| 40 | 5.90 | 5.90 | 5.88 | NT | 5.30 | NT | 5.59 |
| 41 | 5.77 | 5.62 | 3.91 | NT | 1.10 | NT | 1.50 |
| 42 | 4.95 | 4.68 | 2.89 | NT | 1.95 | NT | 1.44 |
| 43 | 6.05 | 4.58 | 2.28 | NT | NT | NT | NT |
| 44 | 5.94 | 5.72 | 4.33 | NT | NT | NT | NT |
| 45 | 5.28 | 4.57 | 0.80 | NT | NT | NT | NT |
| 46 | 5.91 | 4.63 | 2.52 | NT | NT | NT | NT |
| 47 | 5.84 | 5.84 | 5.64 | NT | NT | NT | NT |
| 48 | 0.70 | 2.75 | 2.58 | NT | NT | NT | NT |
| 49 | 0.74 | 3.03 | 4.30 | NT | NT | NT | NT |
| 50 | 5.88 | 5.52 | 4.50 | NT | NT | NT | NT |
| 51 | 5.25 | 1.46 | 0.57 | NT | NT | NT | NT |

NT signifies that performance was not tested

TABLE 18

| Example | OLS at 45 min. cure (MPa) | OLS at 60 min. cure (MPa) | OLS at 75 min. cure (MPa) | OLS at 90 min. cure (MPa) | OLS at 105 min. cure (MPa) | OLS at 120 min. cure (MPa) | OLS at 135 min. cure (MPa) | OLS at 150 min. cure (MPa) |
|---|---|---|---|---|---|---|---|---|
| 29 | 0.01 | 0.01 | 0.02 | 0.12 | 0.46 | 2.59 | NT | NT |
| 30 | NT | NT | NT | NT | NT | NT | NT | NT |
| 31 | NT | NT | NT | NT | NT | NT | NT | NT |
| 32 | NT | NT | NT | NT | NT | NT | NT | NT |
| 33 | 0.11 | 0.54 | 1.14 | 2.28 | 3.28 | 4.36 | NT | NT |
| 34 | 0.08 | 0.10 | 0.16 | 0.11 | 0.21 | 0.41 | NT | NT |
| 35 | NT | NT | NT | NT | NT | NT | NT | NT |
| 36 | 0.06 | 0.26 | 1.46 | 4.86 | 5.35 | 5.28 | NT | NT |
| 37 | 0.08 | 0.38 | 3.33 | 5.79 | 5.60 | 5.89 | NT | NT |
| 38 | 0.06 | 0.98 | 1.26 | 1.23 | 0.95 | 1.32 | NT | NT |
| 39 | 0 | 0 | 0 | 0 | 0.03 | 0.12 | 1.93 | NT |
| 40 | 0 | 0 | 0 | 0 | 0 | 0.04 | 0.43 | NT |
| 41 | 0.03 | 0.05 | 0.04 | 0.10 | 0.09 | 0.14 | 0.20 | 0.26 |
| 42 | 0.01 | 0 | 0.01 | 0 | 0 | 0.04 | 0.19 | 0.05 |
| 43 | 0.08 | 0.15 | 0.23 | 0.35 | 0.37 | 0.48 | NT | NT |
| 44 | 0.05 | 0.14 | 0.24 | 0.28 | 0.42 | 0.52 | NT | NT |
| 45 | 0.10 | 0.43 | 1.57 | 2.81 | 3.21 | 4.00 | NT | NT |
| 46 | 0.04 | 0.15 | 0.19 | 0.28 | 0.41 | 0.47 | NT | NT |
| 47 | 0.06 | 0.10 | 0.25 | 0.58 | 0.75 | 1.68 | NT | NT |
| 48 | 0.14 | 0.24 | 0.68 | 0.62 | 1.10 | 1.98 | NT | NT |
| 49 | 0.14 | 0.12 | 0.28 | 0.34 | 0.43 | 0.51 | NT | NT |
| 50 | 0.12 | 0.17 | 0.27 | 0.28 | 0.48 | 0.68 | NT | NT |
| 51 | 0.08 | 0.15 | 0.34 | 0.62 | 0.85 | 1.32 | NT | NT |

NT signifies that performance was not tested.

TABLE 19

| Example | Worklife (minutes) | T50 (minutes) | T50/WL ratio |
|---|---|---|---|
| 29 | 40 | 101 | 2.5/1 |
| 30 | <10 | ND | ND |
| 31 | 10 | ND | ND |
| 32 | <10 | ND | ND |
| 33 | <10 | 55 | >5.5/1 |
| 34 | 10 | 120 | 12/1 |
| 35 | ND | ND | ND |
| 36 | <10 | 65 | >6.5/1 |
| 37 | <10 | 60 | >6/1 |
| 38 | ND | 55 | ND |
| 39 | 60 | 123 | 2/1 |
| 40 | 60 | 134 | 2.2/1 |
| 41 | 10 | ND | ND |
| 42 | 10 | ND | ND |
| 43 | 10 | 96 | 9.6/1 |
| 44 | 10 | 96 | 9.6/1 |
| 45 | <10 | 58 | >5.8/1 |
| 46 | 10 | 96 | 9.6/1 |
| 47 | 20 | 81 | 4/1 |
| 48 | <10 | 71 | >7/1 |
| 49 | <10 | 87 | >8.7/1 |
| 50 | 10 | 86 | 8.6/1 |
| 51 | <10 | 75 | >7.5/1 |

ND signifies that a value was not determined

Examples 52–55

Examples 52–55 were prepared and evaluated as in Examples 19–28, except different Polymerizable Compositions and Initiator Components were used.

Two Initiatior Components were prepared.

Initiator Component B

Poly(butyl methacrylate-co-methyl methacrylate) (Aldrich #47,403-7; molecular weight 150,000) (4.00 grams) and dibutyl maleate (6.00 grams) were combined and heated to form a solution. A 2:1 mole ratio triethylborane: 1,6-hexanediamine complex (1.90 grams) was added to the cooled polymer solution and then gently heated under a nitrogen atmosphere to form a homogeneous solution. The air bubbles were allowed to rise and escape. This solution is hereinafter referred to as "Initiator Component B".

Initiator Component C

A slurry containing Blendex 360 (18.05 grams) and dibutyl maleate (33.51 grams) was allowed to stand at 70° C. for 2 hours. The resultant opaque dispersion was allowed to cool and then sheared aggressively with a saw-toothed blade of a laboratory dispersator, available from Premier Mill Corporation; Reading, Pa. A 2:1 mole ratio triethylborane:1,6-hexanediamine complex (1.90 grams) and a portion of this dispersion (10.00 grams) were combined and gently heated under a nitrogen atmosphere to form a homogeneous dispersion. The air bubbles were allowed to rise and escape. This dispersion is hereinafter referred to as "Initiator Component C".

Polymerizable Compositions

A slurry containing Blendex 360 (58.41 grams) and THFMA (161.59 grams) was allowed to stand at 70° C. for 2 hours. The resultant opaque dispersion was allowed to cool and then sheared aggressively with a saw-toothed blade of a laboratory dispersator, available from Premier Mill Corporation; Reading, Pa. This monomer blend is hereinafter referred to as "Monomer Blend D". Two Polymerizable Compositions were prepared as in Examples 19–28 using the components shown in Table 20.

TABLE 20

| Polymerizable Composition | Weight Monomer Blend D (grams) | Weight MAEAcAc (grams) | Weight PUMA1250 (grams) | Weight Metal Salt Solution A (grams) | Weight Z-light W 1600 (grams) |
|---|---|---|---|---|---|
| A | 89.34 | 8.36 | 0 | 0.10 | 2.20 |
| B | 79.34 | 8.36 | 10.00 | 0.10 | 2.20 |

Each of Polymerizable Compositions A and B were packaged opposite each of Initiator Components B and C, as shown in Table 21 using the method described in Examples 19–28. Test specimens were prepared and tested according to the Test Methods outlined above. The results are summarized in Tables 21–23. In Table 24 to 0.34 MPa HDPE OLS (T50), Worklife (WL) and the T50/WL ratio were estimated for Examples 52–55.

TABLE 21

| Example | Initiator Component | Polymerizable Composition | HDPE T-peel (N/cm) | HDPE OLS (MPa) | PP OLS (MPa) |
|---|---|---|---|---|---|
| 52 | B | A | 21 | 5.87 | 2.21 |
| 53 | B | B | SB | 5.86 | 2.36 |
| 54 | C | A | 19 | 5.84 | 2.81 |
| 55 | C | B | SB | 5.83 | 2.71 |

SB signifies that the substrate broke

TABLE 22

| Example | OLS at 10 min Open Time (MPa) | OLS at 20 min Open Time (MPa) | OLS at 30 min Open Time (MPa) | OLS at 45 min Open Time (MPa) | OLS at 60 min Open Time (MPa) |
|---|---|---|---|---|---|
| 52 | 5.76 | 5.88 | 5.82 | 5.31 | 3.86 |
| 53 | 5.85 | 5.82 | 5.85 | 3.28 | 3.71 |
| 54 | 5.81 | 5.79 | 5.81 | 5.92 | 4.54 |
| 55 | 5.75 | 5.85 | 5.61 | 4.94 | NT |

NT signifies that performance was not tested.

TABLE 23

| Example | OLS at 45 minutes cure (MPa) | OLS at 60 minutes cure (MPa) | OLS at 75 minutes cure (MPa) | OLS at 90 minutes cure (Mpa) | OLS at 105 minutes cure (MPa) |
|---|---|---|---|---|---|
| 52 | 0 | 0.01 | 0.11 | 0.39 | 1.09 |
| 53 | 0 | 0.06 | 0.14 | 0.49 | 0.74 |
| 54 | 0 | 0 | 0.08 | 0.39 | 1.13 |
| 55 | 0.01 | 0.05 | 0.19 | 0.59 | 1.79 |

TABLE 24

| Example | Worklife (minutes) | T50 (minutes) | T50/WL ratio |
|---|---|---|---|
| 52 | 30 | 88 | 3/1 |
| 53 | 30 | 88 | 3/1 |
| 54 | 45 | 88 | 2/1 |
| 55 | 30 | 81 | 2.7/1 |

Examples 56–59

Polymerizable Compositions were prepared as in Examples 19–28, except with various decomplexers as shown in Table 25. Each Polymerizable Composition was packaged opposite Initiator Component A, as in Examples 19–28. Test specimens were prepared and tested according to the Test Methods outlined above. The results are shown in Tables 27–29. In Table 30 the time to 0.34 MPa HDPE OLS (T50), Worklife (WL) and the T50/WL ratio were estimated for Examples 38–44.

TABLE 25

| Example | Weight Monomer Blend C (grams) | Weight (grams) and Identity of Decomplexer | Weight Metal Salt Solution A (grams) |
|---|---|---|---|
| 56 | 43.62 | 6.33 $DEGAcAc_2$ | 0.05 |
| 57 | 40.38 | 9.57 p(Sty-AAcAc) | 0.05 |
| 58 | 42.27 | 7.68 MAEAcAc | 0.05 |
| 59 | 48.89 | 0.91 PhNHAcAc | 0.20 |

Examples 60–68

A slurry of copper (II) bromide (5.00 grams) in dimethylacrylamide (15.00 grams) was heated to form a homogeneous black solution. This copper (II) bromide solution is hereinafter referred to as “Metal Salt Solution T”.

Hexahydrophthalic anhydride (10.00 grams) was dissolved in THFMA (15.00 grams). This solution was used to prepare Examples 47–58.

Polymerizable Compositions were prepared as in Examples 1–10, except with a different decomplexer (hexahydrophthalic anhydride), and replacing Metal Salt Solution A with Metal Salt Solution T as shown in Table 26. Each Polymerizable Composition was packaged opposite Initiator Component A, as in Examples 19–28. Test specimens were prepared and tested according to the Test Methods outlined above. The results are shown in Tables 27–29. In Table 30 the time to 0.34 MPa HDPE OLS (T50), Worklife (WL) and the T50/WL ratio were estimated for Examples 47–58.

TABLE 26

| Example | Weight Monomer Blend C (grams) | Weight HHPhAnh solution (grams) | Weight MAEAcAc (grams) | Weight Metal Salt Solution T (grams) |
|---|---|---|---|---|
| 60 | 47.66 | 0.99 | 1.25 | 0.10 |
| 61 | 47.17 | 1.48 | 1.25 | 0.10 |
| 62 | 49.06 | 0.69 | 0.15 | 0.10 |
| 63 | 48.89 | 0.69 | 0.32 | 0.10 |
| 64 | 48.57 | 0.69 | 0.64 | 0.10 |
| 65 | 45.88 | 0.05 | 3.97 | 0.10 |
| 66 | 46.03 | 0.10 | 3.77 | 0.10 |
| 67 | 46.35 | 0.19 | 3.36 | 0.10 |
| 68 | 46.96 | 0.39 | 2.55 | 0.10 |

TABLE 27

| Example | HDPE T-peel (N/cm) | HDPE OLS (MPa) | PP OLS (MPa) |
|---|---|---|---|
| 56 | 58 | 4.11 | 3.96 |
| 57 | 37 | 5.87 | 5.12 |
| 58 | SB | 5.86 | 3.54 |
| 59 | NT | 5.61 | 0.94 |
| 60 | SB | 6.56 | 8.03 |
| 61 | SB | 6.54 | 8.08 |
| 62 | SB | 6.52 | 7.27 |
| 63 | SB | 6.48 | 7.77 |
| 64 | SB | 6.46 | 7.97 |
| 65 | SB | 6.11 | 2.65 |
| 66 | SB | 6.61 | 2.45 |
| 67 | SB | 6.63 | 3.01 |
| 68 | SB | 6.61 | 3.73 |

NT signifies that performance was not tested, SB signifies that the substrate broke

TABLE 28

| Example | OLS at 10 min Open Time (MPa) | OLS at 20 min Open Time (MPa) | OLS at 30 min Open Time (MPa) | OLS at 45 min Open Time (MPa) | OLS at 60 min Open Time (Mpa) |
|---|---|---|---|---|---|
| 56 | 4.29 | 3.83 | 3.51 | 3.10 | 1.91 |
| 57 | 5.52 | 5.58 | 5.69 | 5.59 | 5.34 |
| 58 | 5.87 | 5.92 | 5.86 | 5.54 | 2.73 |
| 59 | 4.77 | 4.01 | 3.38 | NT | NT |
| 60 | 5.49 | 3.72 | 2.05 | NT | NT |
| 61 | 4.39 | 3.39 | 1.53 | NT | NT |
| 62 | 6.49 | 6.33 | 4.61 | NT | NT |
| 63 | 6.45 | 5.73 | 4.38 | NT | NT |
| 64 | 6.49 | 5.59 | 3.41 | NT | NT |
| 65 | 6.63 | 6.61 | 6.24 | 6.52 | 6.63 |
| 66 | 6.60 | 6.67 | 6.62 | 6.56 | 4.50 |
| 67 | 6.57 | 5.99 | 6.50 | 5.27 | NT |
| 68 | 5.94 | 6.28 | 2.97 | NT | NT |

NT signifies that performance was not tested.

TABLE 29

| Example | OLS at 45 min. cure (MPa) | OLS at 60 min. cure (MPa) | OLS at 75 min. cure (MPa) | OLS at 90 min. cure (MPa) | OLS at 105 min. cure (MPa) | OLS at 120 min. cure (MPa) | OLS at 135 min. cure (MPa) | OLS at 150 min. cure (MPa) | OLS at 180 min. cure (MPa) |
|---|---|---|---|---|---|---|---|---|---|
| 56 | NT | NT | NT | NT | NT | NT | NT | NT | NT |
| 57 | NT | NT | NT | NT | NT | NT | NT | NT | NT |
| 58 | 0 | 0.02 | 0.14 | 0.52 | 1.55 | NT | NT | NT | NT |
| 59 | NT | NT | NT | NT | NT | NT | NT | NT | NT |
| 60 | 0.15 | 0.49 | 0.50 | 0.99 | NT | NT | NT | NT | NT |
| 61 | 0.12 | 0.26 | 0.38 | 0.55 | NT | NT | NT | NT | NT |
| 62 | 0.08 | 0.15 | 0.36 | 0.31 | NT | NT | NT | NT | NT |
| 63 | 0.07 | 0.17 | 0.46 | 0.54 | NT | NT | NT | NT | NT |
| 64 | 0.09 | 0.39 | 0.61 | 0.54 | NT | NT | NT | NT | NT |
| 65 | 0 | 0.01 | 0.08 | 0.26 | 1.10 | NT | NT | NT | NT |
| 66 | 0 | 0.06 | 0.25 | 1.12 | 2.58 | NT | NT | NT | NT |
| 67 | 0.04 | 0.27 | 0.85 | 2.62 | 5.94 | NT | NT | NT | NT |
| 68 | 0.24 | 1.02 | 3.31 | 5.64 | 6.45 | NT | NT | NT | NT |

NT signifies that performance was not tested.

TABLE 30

| Example | Worklife (minutes) | T50 (minutes) | T50/WL ratio |
|---|---|---|---|
| 56 | 30 | ND | ND |
| 57 | 60 | ND | ND |
| 58 | 45 | 85 | 1.9/1 |
| 59 | 30 | ND | ND |
| 60 | <10 | 62 | >6.2/1 |
| 61 | <10 | 73 | >7.3/1 |
| 62 | 20 | 77 | 3.9/1 |
| 63 | 10 | 70 | 7/1 |
| 64 | 10 | 61 | 6.1/1 |
| 65 | 60 | 91 | 1.5/1 |
| 66 | 45 | 76 | 1.7/1 |
| 67 | 30 | 62 | 2/1 |
| 68 | 15 | 47 | 3/1 |

ND signifies that a value was not determined

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. An initiator system, comprising:

a complexed initiator comprising an organoborane complex; and a β-ketone compound decomplexer having a structure represented by formula (1) or formula (2):

(1)

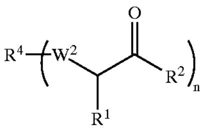

or

-continued (2)

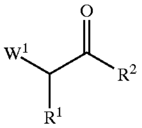

wherein:

for formula (1):

$R^1$ is hydrogen or an organic group;

$R^2$ is an organic group;

$W^2$ is an electron withdrawing group selected from the group consisting of —$O_2C$—, —(CO)—, —HN(CO)—, and —$NR^3$(CO)—; where $R^3$is an organic group;

$R^4$ is an organic group having valence n; and n is an integer greater than zero;

and wherein for formula (2):

$R^1$ is hydrogen or an organic group;

$R^2$ is an organic group; and $W^1$ is an electron withdrawing group is selected from the group consisting of NC— and $H_2N$(CO)—.

2. The initiator system of claim 1, wherein the decomplexer is an acetoacetamide decomplexer having a structure represented by the following formulas:

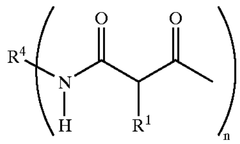

or

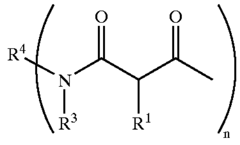

.

3. The initiator system of claim 1, wherein the decomplexer is an acetoacetate decomplexer having a structure represented by the following formula:

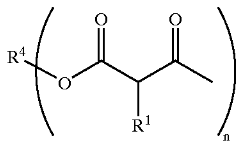

.

4. The initiator system of claim 1, wherein $R^2$ is hydrogen.

5. The initiator system of claim 1, wherein $R^2$ is an aliphatic group.

6. The initiator system of claim 1, wherein $R^2$ is a methyl group.

7. The initiator system of claim 1, wherein $W^2$ is selected from the group consisting of —$O_2C$—, —HN(CO)—, and —$NR^3$(CO)—.

8. The initiator system of claim 1, wherein the decomplexer is selected from the group consisting of methyl acetoacetate, ethyl acetoacetate, t-butyl acetoacetate, 2-methacryloyloxyethyl acetoacetate, diethylene glycol bis (acetoacetate), polycaprolactone tris(acetoacetate), polypropylene glycol bis(acetoacetate), poly(styrene-co-allyl acetoacetate), N,N-dimethylacetoacetamide, N-methylacetoacetamide, acetoacetanilide, ethylene bis (acetoacetamide), polypropylene glycol bis (acetoacetamide), acetoacetamide, and acetoacetonitrile.

9. The initiator system of claim 1 further including a second decomplexer.

10. The initiator system of claim 9, wherein the second decomplexer comprises an anhydride decomplexer.

11. The initiator system of claim 10, wherein the second decomplexer is selected from the group consisting of methacrylic anhydride, succinic anhydride, maleic anhydride, glutaric anhydride, itaconic anhydride, and hexahydrophthalic anhydride.

12. The initiator system of claim 1, wherein the organoborane complex has the structure represented by the following formula:

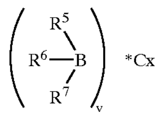

wherein $R^5$ is an alkyl group having 1 to about 10 carbon atoms;

$R^6$ and $R^7$ may be the same or different and are independently selected from alkyl groups having 1 to about 10 carbon atoms and aryl groups;

Cx is a complexing agent; and v is the ratio of boron atoms to complexing agent in the organoborane complex.

13. The initiator system of claim 12, wherein the complexing agent is selected from the group consisting of amines, amidines, hydroxides and alkoxides.

14. The initiator system of claim 1 further comprising a diluent.

* * * * *

UNITED STATES PATENT AND TRADEMARK OFFICE

CERTIFICATE OF CORRECTION

PATENT NO. : 6,849,569 B2
APPLICATION NO. : 10/037074
DATED : February 1, 2005
INVENTOR(S) : Dean M. Moren It is certified that error appears in the above-identified patent and that said Letters Patent is hereby corrected as shown below:

Title page,
Item (54), delete "INITIATOR SYSTEMS COMPRISING β-KETONE COMPOUNDS" and insert in place thereof -- INITIATOR SYSTEMS COMPRISING β-KETONE COMPOUNDS AND BONDING COMPOSITIONS MADE THEREWITH --.

Column 1,
Lines 1 – 2, delete "INITIATOR SYSTEMS COMPRISING β-KETONE COMPOUNDS" and insert in place thereof -- INITIATOR SYSTEMS COMPRISING β-KETONE COMPOUNDS AND BONDING COMPOSITIONS MADE THEREWITH --.

Column 4,
Line 24, delete "N-methylacetoacetarnide" and insert in place thereof -- N-methylacetoacetamide --.

Column 20,
Line 27, delete "ConProtec)" and insert in place thereof -- ConProTec) --.

Column 22,
Table 6, Example 17, under OLS at 150 min cure (MPa), delete "0.23" and insert in place thereof -- 0.21 --.

Column 25,
Line 53, after "Company" insert -- , --.

Column 26,
Line 62, after "as" insert -- in --.

Column 29,
Line 60, delete "Initiatior" and insert in place thereof -- Initiator --.

Column 31,
Line 4, after "24" insert -- the time --.

UNITED STATES PATENT AND TRADEMARK OFFICE

CERTIFICATE OF CORRECTION

PATENT NO. : 6,849,569 B2
APPLICATION NO. : 10/037074
DATED : February 1, 2005
INVENTOR(S) : Dean M. Moren It is certified that error appears in the above-identified patent and that said Letters Patent is hereby corrected as shown below:

Column 35,
Line 25, delete "$R^2$" and insert in place thereof -- $R^1$ --.

Signed and Sealed this

Twenty-second Day of May, 2007

JON W. DUDAS
*Director of the United States Patent and Trademark Office*